United States Patent [19]

Farley et al.

[11] B 3,989,986
[45] Nov. 2, 1976

[54] METAL ENCLOSED SWITCHGEAR HAVING WELL-SHAPED FRONT COVERS

[75] Inventors: James R. Farley, Pittsburgh; John G. Salvati; Louis N. Ricci, both of Beaver Falls, all of Pa.

[73] Assignee: Westinghouse Electric Corporation, Pittsburgh, Pa.

[22] Filed: Sept. 26, 1974

[21] Appl. No.: 509,606

[44] Published under the second Trial Voluntary Protest Program on February 3, 1976 as document No. B 509,606.

Related U.S. Application Data

[63] Continuation of Ser. No. 346,551, March 30, 1973.

[52] U.S. Cl. .............................. 317/120; 200/293; 312/223
[51] Int. Cl.[2] .......................................... H02B 1/10
[58] Field of Search ........... 317/112, 117, 119, 120; 312/223; 200/293, 296, 297, 307, 42 T

[56] References Cited
UNITED STATES PATENTS

| | | | |
|---|---|---|---|
| 2,786,162 | 3/1957 | Ballou | 317/119 |
| 2,978,613 | 4/1961 | Hein | 317/119 |
| 3,321,672 | 5/1967 | Kuhn et al. | 317/120 |
| 3,348,103 | 10/1967 | Berry | 317/120 |
| 3,743,892 | 7/1973 | Fritz et al. | 317/120 |
| 3,780,355 | 12/1973 | Salvati et al. | 317/120 |

Primary Examiner—Gerald P. Tolin
Attorney, Agent, or Firm—R. E. Converse, Jr.

[57] ABSTRACT

Each section of a three-phase metal enclosed switchgear unit is provided with main through horizontal bus and vertical section bus. The front of each switchgear section is divided into vertically disposed enclosures for housing circuit breakers or circuit interrupting devices. The circuit breakers are mounted close to the vertical section bus with the front of the circuit breaker and the circuit breaker operating handle recessed from the front of the switchgear section. Pan or well-shaped front covers, having a bottom surface flushed with the circuit breaker fit over the front of the vertically disposed enclosures and are mounted to the front of the switchgear section. Different depth wells or pans are used for the front cover, with the depth being determined by the circuit breaker physical size, which is dependent on the breaker rating. The surface of the well flush with the circuit breaker device has a cutout through which the circuit breaker operating handle projects. The front cover wells provide a dead front construction with easy access to the circuit breaker operating handles. A portion of the cover well approximately flushed with the front of the circuit breaker can have additional cutouts for showing breaker rating and providing easy access to external magnetic breaker adjustments.

21 Claims, 11 Drawing Figures

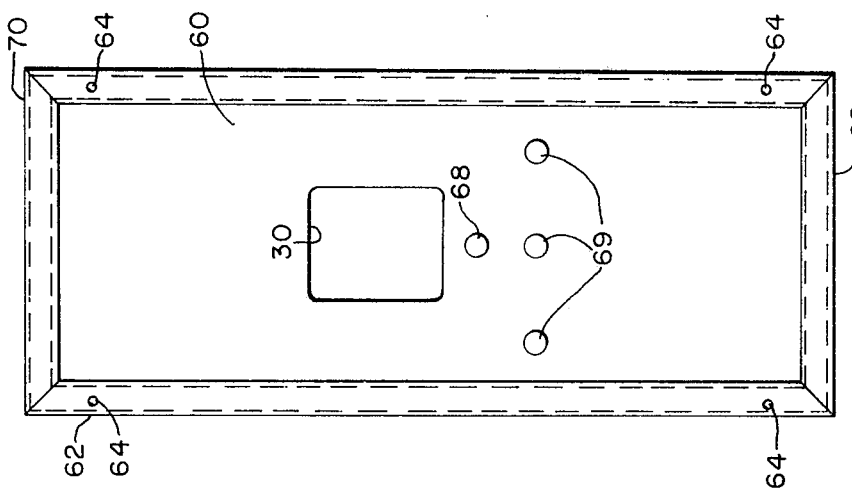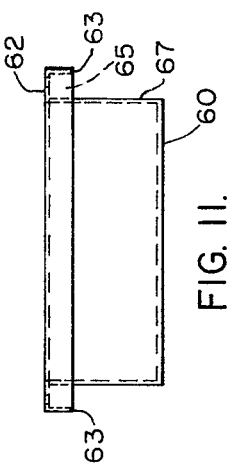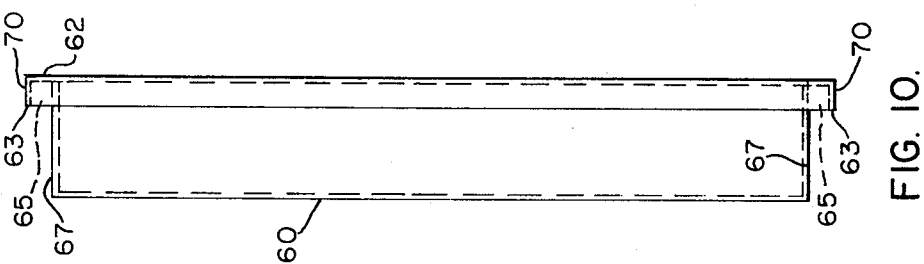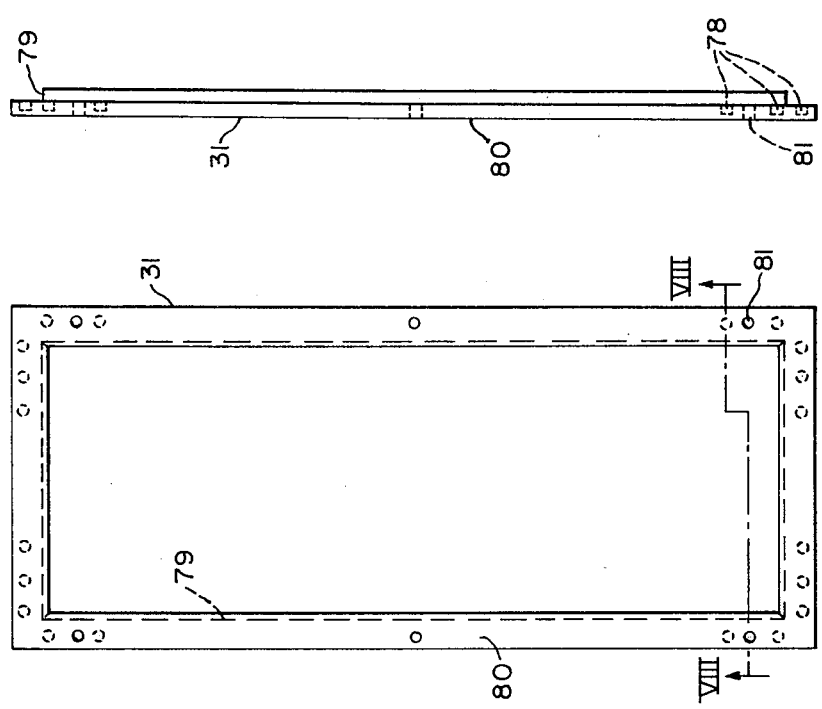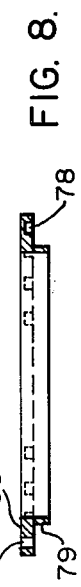

METAL ENCLOSED SWITCHGEAR HAVING WELL-SHAPED FRONT COVERS

This is a continuation of application Ser. No. 346,551, filed Mar. 30, 1973.

BACKGROUND OF THE INVENTION

This invention relates generally to switchgear and more particularly to metal enclosed switchgear of a type suitable for relatively low voltage power distribution service. More specifically this invention relates to front covers having a recessed portion flush with circuit interrupting devices mounted in the switchgear unit and providing a dead front construction.

A metal enclosed switchgear installation usually includes one or more units with each unit consisting of a plurality of sections or cells. The sections are assembled side-by-side to provide a unit or switchgear assembly capable of housing a desired number of circuit breakers or other circuit controlling devices. The maximum number of sections assembled in a unit at the factory is usually governed by the handling and shipping facilities available. The associated main horizontal bus and the vertical risers or conductors are electrically connected at one or more points. For economic reasons it is desirable that the amount of through horizontal bus, vertical section bus, branch bus, load side extensions and interconnecting conductors be kept to a minimum. This can best be achieved by having the horizontal through bus for each phase of a three-phase system spaced apart in a vertical plane behind the vertical section bus. It is also desirable to mount the molded case circuit breakers or other circuit interrupting or controlling devices as close to the vertical section bus as practical so as to reduce the amount of required branch bus and the length of the load side extensions.

Each switchgear section comprises a structural framework in a formed sheet metal enclosure. Each switchgear unit generally has a breaker compartment at the front, a cable compartment at the rear and a bus or conductor compartment between the cable compartment and the breaker compartment. The breaker compartment can be divided into a plurality of individual enclosures for housing circuit breakers or other circuit controlling devices.

The bus compartment contains main through bus bars and vertical riser conductors or vertical section bus to which the branch bus and individual circuit breakers are connected. Loadside conductors extend from the circuit breaker, past the vertical bus, through the bus compartment, and terminate in the cable compartment at the rear of the switchgear cell. In order to keep the length of the loadside conductors and the branch bus to a minimum, it is desirable that the depth of the main bus compartments be kept small and the breakers be mounted close to the vertical bus. When the circuit breakers or circuit controlling devices are mounted close to the vertical section bus the front of the breaker and the operating handles of the breaker are recessed from the front of the switchgear unit. In some prior art switchgear assemblies extensions have been added to the operating mechanism so that the operating handle extension is flushed with the front of the switchgear unit. These operating handle mechanisms add cost to the switchgear unit and complicate the switchgear assembly. As is well known in the prior art, the circuit interrupters normally include a rating indication and magnetic breaker adjustment on the front cover. Also, with the operating handle extensions in place and the front cover plate flush with the switchgear front and not flush with the circuit breaker it is necessary to remove the front cover plate to obtain access to the front of the circuit breaker for adjustment of the external magnetic breaker trip.

SUMMARY OF THE INVENTION

In accordance with the invention the metal enclosed switchgear unit is provided with main through horizontal bus and vertical section bus conductors having circuit interrupting devices mounted thereto. The circuit breakers are mounted close to the vertical section bus and are recessed from the front of the switchgear section. A well or pan-shaped cover is mounted to the switchgear unit. The outer edges of the well-shaped cover are flush with the front of the switchgear unit and the inner surface is approximately flush with the circuit breaker. A cutout is made in the inner flat portion of the well-shaped cover for the circuit breaker operating handle to pass therethrough.

The main through bus comprises flat bus bars having their longitudinal axis extending in a horizontal direction, with each phase being separated by a vertical space. The phases of the horizontal through bus are positioned in a spaced apart relationship with the bus bar width axes, of all phases, lying in a generally vertical plane. That is, the bus bars of each phase are positioned in an edge-to-edge spaced apart relationship with the bus bars of the other phase. The vertical section bus conductors are disposed in front of the main through horizontal bus a sufficient distance to maintain the required through air clearance. The phases of the vertical bus conductors are separated also by a sufficient distance to maintain the required phase-to-phase through air clearance. The front of the switchgear section is divided into vertically disposed enclosures for housing various ratings of circuit breakers or circuit controlling devices. Circuit interrupters are mounted in these multiple enclosures close to the vertical section bus and recessed from the front of the switchgear section. Well-shaped covers having a portion of their outer edge attached to the front of the switchgear section and having an inner flat surface approximately flushed with the front of the circuit interrupting devices. Openings are provided in the flat portion of the well-shaped cover for the circuit breaker handle. Additional openings can be provided as required for showing interrupting rating, allowing adjustment of the device, or permitting easy access to fuses or other elements.

In one embodiment of the invention the well cover is formed in one piece. The well-shaped cover is generally rectangular in shape with a hollow lip portion formed around the outer circumference. This hollow lip portion raises the outward facing lip surface flush with the front of the switchboard, and provides a covered space, inside the lip portion, for concealing some mounting apparatus. When the well-shaped cover is in place mounting hardware located beneath the lip is not visible. The portion of the outer lip, flushed with the front of the switchboard, is provided with several holes for mounting to the switchgear frame. In another embodiment of the invention, the rectangular well-shaped cover is formed with a flat edge around the outer periphery which is mounted to a slightly recessed portion of the switchboard frame. A molded trim piece is then attached to the edge of the cover, bringing it flush with the front of the switchboard section. Voids are provided in the molded trim to cover mounting hardware which may be exposed. The trim can be held magnetically to the well-shaped cover, thus presenting a switchgear front free from exposed mounting hardware. Since the various interrupting devices vary in size, different size and depth of well-shaped covers are required. The depth of the well-shaped covers are determined by the distance of the front of the circuit breaker is set back from the front of the switchboard section. The flat inner surface of the covers is flush with the device being covered to provide a dead front construction. An opening is provided in the cover for the circuit breaker operating handle. Additional openings can be provided for breaker rating indication and easy access to adjustments. Recessed circuit breakers, with a well-shaped cover, provides several advantages over the prior art construction, such as providing easy direct access to the breaker handles and eliminating complicated and expensive extensions or operating mechanisms. Recessing the circuit breaker handles from the front of the switchboard provides protection of the handles against breakage in shipment and provides safety against accidental tripping of the breakers while in service. This construction also provides a dead front construction, easy access through cutouts to the external magnetic breaker adjustments and a low cost construction. Provisions for locking the handle in the off position may also be easily provided by turning up a tab or welding a tab near the breaker handle cutout.

The wells may be manufactured in numerous ways. Two embodiments are the one-piece construction and the two-piece construction with the sheet metal well and a molded picture frame type trim. Although in these embodiments it is shown that the main portion of the well-shaped covers are made from sheet metal, it is to be understood that they could be molded, cast or constructed in other manners from metallic and non-metallic materials.

BRIEF DESCRIPTION OF THE DRAWINGS

For a better understanding of the invention, reference may be had to the preferred embodiment exemplary of the invention shown in the accompanying drawings in which:

FIG. 6 is a front view of the picture frame type trim utilized with the well type cover shown in FIG. 4;

FIG. 7 is a side view of the trim frame shown in FIG. 6;

FIG. 8 is a section view along the lines VIII—VIII shown in FIG. 6;

FIG. 9 is a front view of an alternate construction of a well type front cover;

FIG. 10 is a side view of the well type cover shown in FIG. 9; and

FIG. 11 is an end view of the well type front cover shown in FIG. 9.

DESCRIPTION OF THE PREFERRED EMBODIMENT

Figure 1:
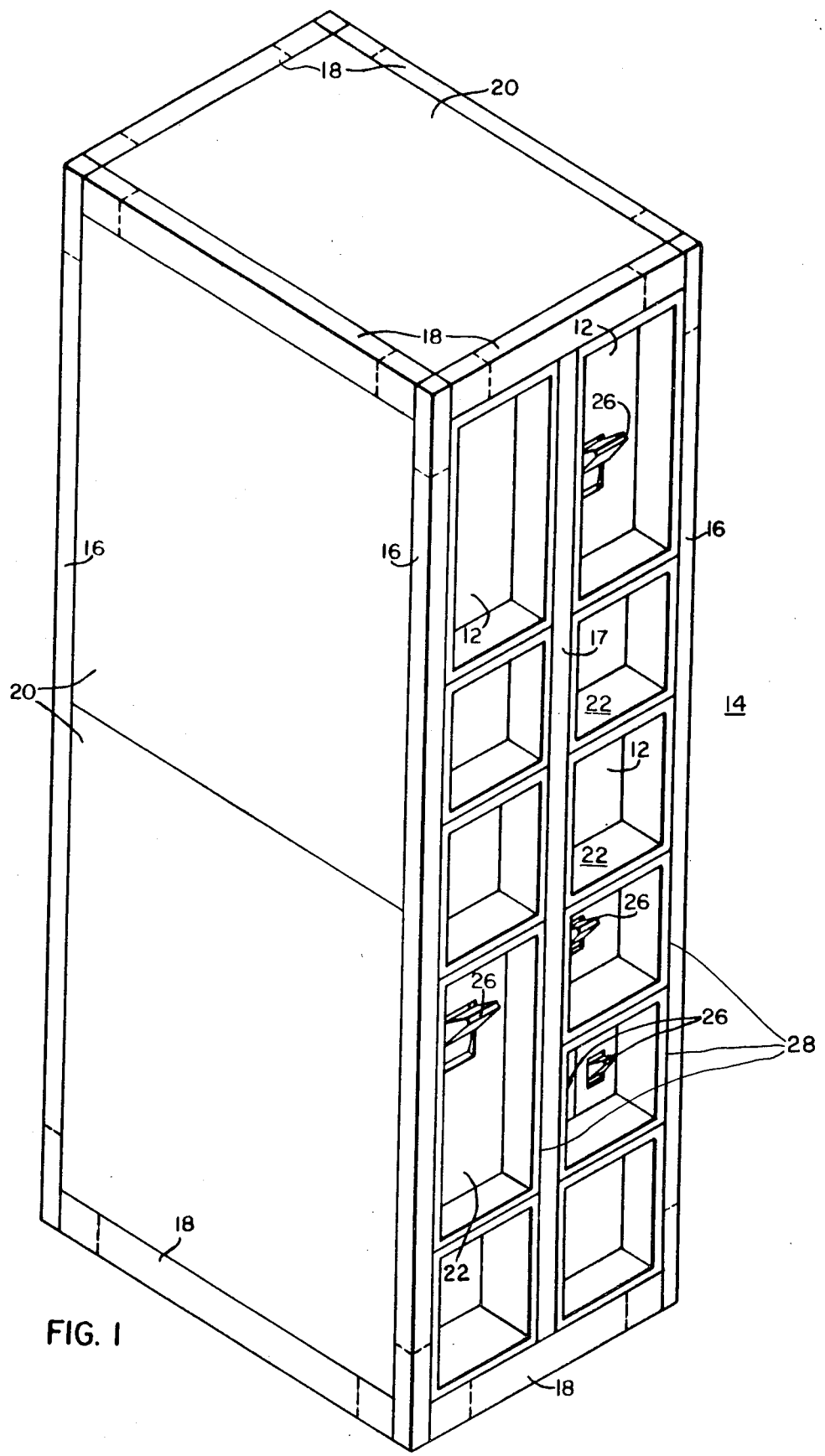
FIG. 1 is a perspective view of a double section switchgear unit utilizing the teachings of the present invention.
Figure 3:
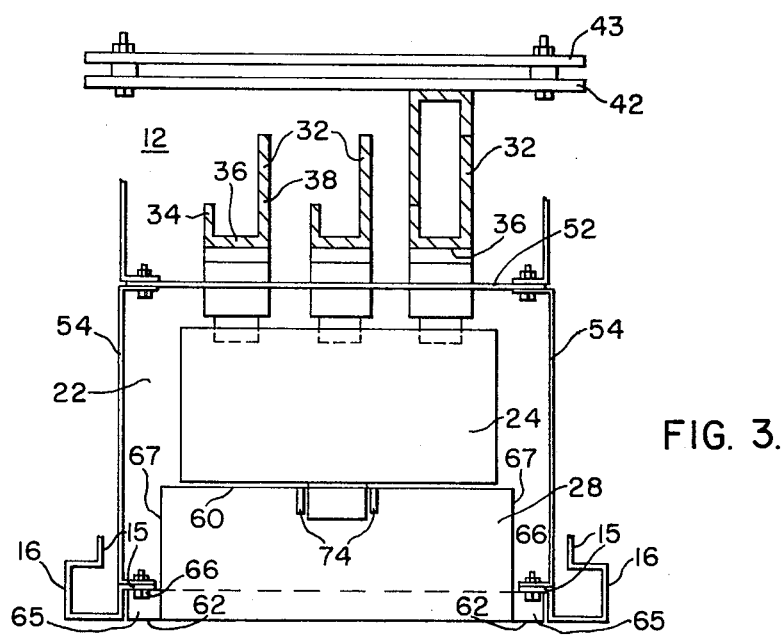
FIG. 3 is a sectional view of the switchgear units shown in FIG. 2 along the lines III—III.
Figure 4:
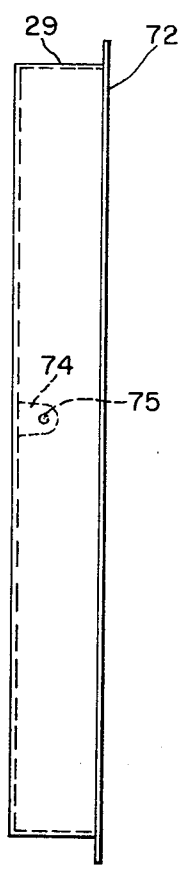
FIG. 4 is a side view of a front cover utilizing the recessed or well type construction.
Figure 5:
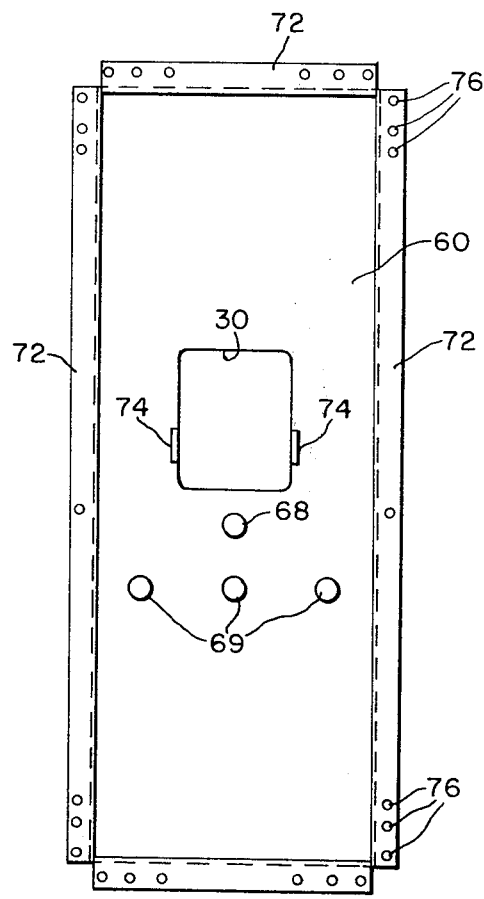
FIG. 5 is a front view of the cover shown in FIG. 4.

Referring now to the drawings and to FIG. 1 in particular, there is shown a switchgear unit 14 comprising two generally rectangular upstanding section or cells 12 disposed in side-by-side relationship. Additional sections 12 may be added as desired. Generally each switchgear unit 14 comprises structural members 16, 17 and 18 to which formed cover sheets 20 are added. The front portion of each switchgear section 12 is divided into small enclosures 22 for various circuit breakers and circuit controlling apparatus. These enclosures 22 are disposed one below the other for the height of switchgear section 12. As best shown in FIGS. 1 and 3 when molded case circuit breakers 24 are mounted in the switchgear section 12 the front of the circuit breaker 24 is set back from the front of the switchgear section 12. The operating handles 26 of the molded case circuit breakers 24 are also recessed from the front of the switchgear section 12. Covers 28 which are attached to the vertical structural members 16 or 17 form a part of the front face of switchgear unit 14. Circuit breaker operating handles 26 project through openings 30 formed in the front covers 28. The circuit breaker 24 is thus set back from the front of the switchboard unit 10 flush with a portion of a shallow well or cover 28 and is partially protected from material or personnel moving across the front of the switchgear unit 14.

Each switchgear section 12 comprises J-shaped vertical section bus members 32 as shown in FIG. 3. The J-shaped section bus 32 comprises a short leg section 34, a flat surface 36 extending perpendicular to the short leg 34 and a long leg section 38 attached to the other end of the flat surface 36 and extending perpendicular thereto in the same direction as the short leg 34. The front of flat surface 36 faces the front of the switchgear section 12. Circuit breaker 24 is connected to the flat surface 36 of the J-shaped bus 32.

Figure 2:
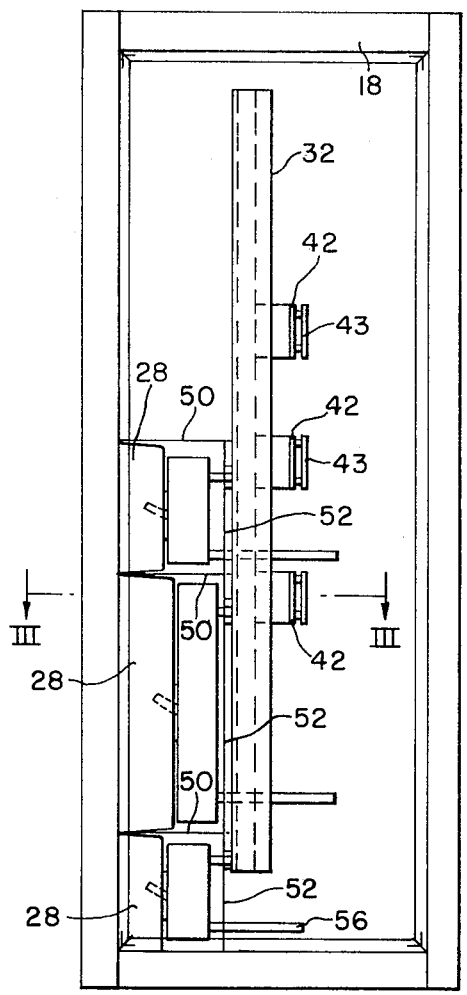
FIG. 2 is a side view of a switchgear unit utilizing the teaching of the present invention.

As shown in FIGS. 2 and 3, the main through bus 42 extends horizontal in the switchgear unit 14. Additional bus bars 43 can be added to each phase of the horizontal through bus 42 until the desired current rating is obtained. These additional bus bars 43 can be added to each phase of the horizontal through bus 42 until the desired current rating is obtained. These additional bus bars 43 for each phase of the switchgear unit 14 are added in a front-to-back spaced apart relationship. The longitudinal axis of the main through bus 42 is disposed in a generally horizontal direction while the width axis of each phase of the main through bus 42 lies generally in a common vertical plane. Three parallel J-shaped vertical sections bus members are located in front of through bus 42 with the flat surface 36 facing the front of the switchgear section 12. The flat surface 36 is made wide enough so that good contact with adequate contact area and acceptable temperature rise can be made between the J-shaped vertical section bus 32 and the largest circuit breaker 24 to be used in switchgear section 12.

The J-shaped vertical section bus 32 is connected to the horizontal through bus 42. This can be done by using a J-shaped connector as shown in FIG. 3 and more fully described in copending application Ser. No. 324,263, now U.S. Pat. No. 3,780,355.

Each switchgear section 12 is divided into smaller enclosures 22 for various circuit breakers 24 which can be disposed one below the other for the heighth of the switchgear section 12. As can best be seen in FIGS. 2 and 3, enclosures 22 comprise top and bottom sheets 50 and side sheets 54. Various sizes of molded case circuit breakers 24 are disposed in enclosure 22 and electrically connected to the J-shaped vertical bus 32. An insulating barrier 52 is disposed between the back of the circuit breaker 24 and the front of the J-shaped vertical section bus 32. Load-side extensions 56 project from the load terminals on the circuit breaker 24 through insulating barrier 52, past the J-shaped bus section 32 towards the rear of the switchgear compartment 12, where cables can easily be attached.

As can best be seen in FIG. 3 a front pan-shaped cover or well 28 is attached to the front of the switchgear section 12 and projects inside of switchgear section 12 so that the recessed flat surface 60 is flushed with circuit breaker 24. As best shown in FIGS. 9, 10 and 11 the outer periphery of well 28 is formed into a hollow lip portion 62. The outer edge 63 of lip portion 62 rests on a slightly recessed portion 5 of structural members 16 or 17, and cover 28 is mounted to structural members 16 or 17 through mounting hole 64. A space 65 is provided in hollow lip 62 which covers mounting hardware 66 when well cover 28 is in place. As shown in FIG. 3, bolts 66 or other mounting hardware 66, attached to structural members 16 or 17, can be covered by lip 62 when well 28 is mounted to switchgear unit 14. The depth of sidewalls 67 of well 28 are determined by how far the breaker 24 is recessed from the front of the switchgear section 12. Various size wells 28 are provided for the different size circuit breakers 24 used in switchgear section 12.

When the circuit breaker 24 is in place and front cover 28 is mounted to switchgear section 12, back surface 60 is approximately flush with the front surface of circuit breaker 24 and presents a dead front construction. Back surface 60 has an opening 30 formed therein through which the handle 26 of circuit breaker 24 projects. An opening 68 is provided beneath opening 30 so that the current rating of circuit breaker 24 covered by well 28 is visible. Additional openings 69 can be formed in surface 60 of well 28 to provide access to the external magnetic breaker adjustments, if desired. When wells 28 are disposed one above the other as shown in FIG. 1 the upper and lower outer edge 70 of lip 62 are adjacent to similar surfaces 70 on adjoining wells 28. Various other openings in well 28 can be formed to permit access to adjustments, fuses, or other apparatus. Using various depth wells to make up the distance from the switchboard front to the front of the breaker eliminates the need for handle extensions or operating mechanisms as required in some prior art construction.

An alternate construction for a switchgear well 28 utilizing two parts is shown in FIGS. 4 to 8. In this construction well 29 is formed with flat flanged portions 72, around the outer periphery. When this construction of well 29 is disposed in switchgear section 12 the side flange surfaces 72 are connected directly to the edge surfaces 15 of structural members 16 or 17 by suitable means, such as bolting or self-tapping screws. Back surface 60 of well 29 has an opening 30 formed therein for receiving circuit breaker handles 26. Opening 68 is provided so that circuit breaker 24 rating is visible. Opening 69 can be provided when desired for easy access to the external magnetic breaker adjustment. It should be understood that in both embodiments of this invention additional openings can be provided in surface 60 to provide access to fuses, additional adjustments or other devices. In any embodiment provisions for locking the breaker handle 26 in the off position may be added to the well 29 by providing a tab 74 at breaker handle cutout 30. This tab 74 can be added to well 28 if desired. Tab 74 can be formed by turning up a portion of the metal from cutout 30, or by welding or otherwise attaching tab 74 to surface 60. Tab 74 is provided with an opening 75 therethrough for receiving a lock to hold the breaker handle in the off position. When well 29 is mounted to surface 15 of structural member 16 the flat edge portions 72 are reset from front of switchboard 14 and mounting hardware 66 and openings 76 in edge 72 are visible. To cover edge 72 and exposed mounting hardware 66 a molded trim piece 31 is disposed around edge 72 after well 29 is in position. Trim piece 31 covers the rough edges around well 29 and also necessary mounting hardware 66 which may project through openings 76 in the edge 72 of weld 29. Voids 78 are formed in the molded trim piece 31 to receive any mounting hardware which may project through opening 76 in flat flanged edge 72. When trim 31 is in position the inner projecting lip 79 fits into well 29 and the outer surface 80 is flush with the front of the switchboard section 12. Trim 31 can be secured to well 29 by bolting through holes 81. In an alternate construction holes 81 can be eliminated from trim 31 and a backing magnetic material can be attached to the inside edge of frame 31, to hold frame 31 securely to switchgear section 12 without any exposed mounting hardware.

With trim 31 in place the two-piece well comprising trim 31 and well 29 provides a dead front construction with a back surface flush with the front of circuit breaker 24 and the outer edge level with the front of switchgear unit 14.

In mounting breakers 24 it is desirable to keep the back of the breaker 24 as close to the vertical bus 32 as possible to minimize both load 56 and line side connectors. Since the breaker 24 differs in depth and since the breakers are recessed behind the front of switchboard section 12, the difference in depth from the front of the breaker 24 to the front of the switchboard is satisfied by the use of wells 28 or 29. The wells provide easy access to the circuit breaker operating handles 26, a dead front construction, protection from handle breakage in shipment, safety from accidental tripping of the circuit breaker 24 during use, and easy access through cutouts to external magnetic adjustments. The wells 28 and 29 are of a low cost construction and provisions for locking the handles in the off position may easily be provided by the use of tabs 74 near the breaker handle cutout 30. Thus, it may be seen that the wells 28 and 29 have many advantages over handle extensions and operating mechanisms used in some prior art switchgear construction.

We claim:

1. A three phase alternating current metal enclosed switchgear unit comprising:
a generally rectangular section structure;
three horizontally extending main through bus bar conductors, one for each phase, disposed horizontally in a spaced apart relationship in said rectangular section;
three vertical riser conductors disposed in said rectangular section in front of said main horizontal through bus conductors;

connector means electrically connecting each phase of said horizontal main through bus to its associated vertical riser;

a plurality of circuit interrupters connected to said vertical risers and recessed from the front of said section structure having operating handles facing and recessed from the front of said section structure and each of said circuit interrupters being disposed vertically upright;

a plurality of circuit-interrupter enclosure means formed at the front of said section structure and each of said circuit interrupter enclosure means having at least one of said circuit interrupters disposed therein and being positioned vertically;

a plurality of front cover means for closing the front of each of said enclosure means so as to provide a dead front construction for said switchgear unit;

each of said front cover means comprising an outer portion aligned with the front of said section structure and which extends around the periphery of said front cover means, and a recessed surface flush with the front of the associated circuit interrupter and having an opening therein through which only the operating handle of the associated circuit interrupter extends; and, said outer portions of said front cover means include a void formed therein for receiving some mounting hardware associated with said switchgear unit.

2. A metal enclosed switchgear unit as claimed in claim 1, wherein:

said front cover means is an integral part formed from sheet metal;

said outer portion extends entirely around the outer periphery of said front cover means;

a side portion connecting said recessed surface to the inside perimeter of said outer portion; and a lip portion extending from the outside perimeter of said outer portion in the same direction as said side portion so that said side portion, said lip portion and said outer portion define an open portion facing the rear of said section structure.

3. A metal enclosed switchgear unit as claimed in claim 1, wherein:

each of said plurality of circuit-interrupter enclosure means comprises an insulating barrier separating said vertical riser from said circuit interrupter.

4. A metal enclosed switchgear unit as claimed in claim 1, wherein:

said circuit interrupter includes an external rating indication on the front of said circuit interrupter; and said external rating indication of said circuit interrupter is visible through an opening in the associated front cover means.

5. A metal enclosed switchgear unit as claimed in claim 1, wherein:

said circuit interrupter includes external magnetic interrupter adjustments accessible from the front of said circuit interrupter; and said front cover means being formed for exposing the external magnetic breaker adjustments of said circuit interrupter.

6. An alternating current metal enclosed switchgear unit comprising:

a generally rectangular section structure;

three horizontally extending main through bus bar conductors disposed horizontally in a spaced apart relationship in said rectangular section;

three vertical riser conductors, each associated with one of said three horizontally extending main through bus bar conductors disposed in said rectangular section in front of said main horizontal through bus conductors;

connector means electrically connecting each phase of said horizontal main through bus bar to its associated vertical riser;

a plurality of circuit interrupters connected to said vertical risers and recessed from the front of said section structure having operating handles facing and recessed from the front of said section structure and each of said circuit interrupters being disposed vertically upright;

a plurality of circuit interrupter enclosure means formed at the front of said section structure and each of said circuit interrupter enclosure means having at least one of said circuit interrupters disposed therein and being positioned vertically;

a plurality of front cover means for closing the front of each of said enclosure means so as to provide a dead front construction for said switchgear unit;

each of said front cover means comprising an outer portion aligned with the front of said section structure and which extends around the periphery of said front cover means, and a recessed surface flush with the front of the associated circuit interrupter and having an opening therein through which only the operating handle of the associated circuit interrupter extends; and wherein said outer portions of said front cover means includes voids formed therein for receiving mounting hardware associated with said switchgear unit.

7. A metal enclosed switchgear unit as claimed in claim 4, wherein:

said outer portion of said front cover means is formed from a molded non-conducting material;

said recessed surface portion is formed from sheet metal and includes a flanged portion which is directly connected to said section structure; and said outer portion of said front cover means is mounted to said switchgear section structure in front of and covering the flanged portion of said recessed surface portion.

8. A metal enclosed switchgear unit as claimed in claim 7, wherein:

said outer portion of said front cover means includes multiple holes formed therein for mounting to said section structure.

9. A metal enclosed switchgear unit as claimed in claim 7, including:

magnetic means attached to the back of said outer portion of said front cover means for mounting said outer portion to said section structure.

10. A metal enclosed switchgear unit as claimed in claim 7, wherein:

said outer portion includes an inward facing lip which fits inside the inner periphery of the flanged portion of said recessed surface position and projects past the flanged portion when said outer portion is mounted to said section structure.

11. A metal enclosed switchgear unit comprising:

a generally rectangular section structure;

three vertical riser conductors disposed in said rectangular section structure;

a plurality of vertically disposed circuit interrupters mounted to said vertical risers and recessed from the front of said section structure;

front cover means mounted to said switchgear unit for covering the front of each of said circuit interrupters having an outer portion flush with the front of said section structure, a recessed flat surface portion flush with the front of the associated circuit interrupter, a side portion connecting said outer portion and said recessed flat surface portion, and a lip portion extending from the edge of said outer portion toward the rear of said switchgear unit; and, said side portion, said lip portion, and said outer portion defining a void around the perimeter of said front cover means for concealing mounting hardware.

12. A metal enclosed switchgear section comprising:
bus conductor means disposed vertically;
a cell unit open at the front of said switchgear section, a circuit interrupter supported vertically in said cell unit in front of said bus conductor means, said circuit interrupter electrically and mechanically connected to said bus conductor means, said circuit interrupter recessed from the front of said section, said circuit interrupter comprising an operating handle at the front thereof manually operable to open and close said circuit interrupter;
front cover means for closing the front of said cell so as to provide a dead front construction for said cell, said front cover means comprising an outer peripheral portion flush with the front of said section, said front cover means comprising an inner portion abutting the front of said circuit interrupter, said inner portion having an opening therein, through which only said handle extends, said front cover means comprising a throat portion between said outer peripheral portion and said inner portion such that said open front of said cell is closed by said front cover means and said front of said circuit interrupter with said handle being in said throat portion and externally accessible from the front of said section for manual operation; and
outwardly projecting tabs formed at the sides of the opening through said inner portion and having holes therein which can be utilized for locking the breaker in the off position.

13. A metal enclosed switchgear section comprising:
a generally rectangular section structure;
a plurality of vertical riser conductors disposed in and positioned towards the front of said generally rectangular section structure;
a plurality of circuit breakers disposed in front of and connected to said plurality of vertical riser conductors;
a plurality of well shaped front covers each being associated with one of said plurality of circuit breakers; and,
each of said plurality of well shaped front covers comprising an outer portion; a recessed surface flush with the front of the associated circuit breaker; and a side wall portion, connecting the outer portion and the recessed surface, whose depth is dependent on the size of the associated circuit breaker.

14. A metal enclosed switchgear section as claimed claim 13, wherein:
each of said plurality of circuit breakers is mounted vertically.

15. A metal enclosed switchgear section as claimed claim 13, wherein:

the outer portion of each of said plurality of well shaped front covers comprises a void.

16. A metal enclosed switchgear unit comprising:
a generally rectangular section structure;
three vertical riser conductors disposed in said generally rectangular section structure;
a plurality of circuit interrupters connected to said three vertical riser conductors and recessed from the front of said generally rectangular section structure having operating handles facing and recessed from the front of said generally rectangular section structure;
each of said plurality of circuit interrupters disposed vertically and being vertically separated from others of said plurality of circuit interrupters;
a plurality of front cover means, each being associated with one of said plurality of circuit interrupters, comprising an outer portion spaced away from the associated circuit interrupter; a recessed surface flush with the front of the associated circuit interrupter and having an opening formed therein through which the operating handle of the associated circuit interrupter projects; and a side wall portion connecting the outer portion and the recessed surface.

17. A metal enclosed switchgear unit as claimed in claim 16, wherein:
said plurality of front cover means closes the front of said generally rectangular section structure and the depth of the side wall portion is dependent on the size of the associated circuit interrupter.

18. A metal enclosed switchgear unit as claimed in claim 17, wherein:
each of said plurality of front cover means is formed from sheet metal and the outer portion defines a part having a generally U shaped inward facing cross section extending around the outer perimeter of said front cover means.

19. Switchgear comprising:
a switchgear cell having a front;
electrical conductors disposed within said switchgear cell;
a plurality of circuit interrupters, recessed from the front of said switchgear cell, connected to said electrical conductors and disposed between said electrical conductors and the front of said switchgear cell; and,
a plurality of pan shaped front covers, each being associated with one of said plurality of circuit interrupters, comprising an outer portion connected to the front of said switchgear cell and an inner flat portion flush with the front of the associated circuit interrupter.

20. Switchgear as claimed in claim 19 wherein:
the depth of each of said pan shaped front covers depends on the size of the associated circuit interrupters;
each of said circuit interrupters comprising an operating handle extending toward the front of said switchgear cell; and,
the inner flat portion of said pan shaped front cover has an opening formed therein through which the operating handle of said associated circuit interrupter extends.

21. Switchgear as claimed in claim 20, wherein:
each of said plurality of circuit interrupters is disposed vertically; and
each of said plurality of circuit interrupters is separated vertically.

* * * * *